United States Patent [19]

Piana et al.

[11] Patent Number: 5,035,048

[45] Date of Patent: Jul. 30, 1991

[54] AUTOMATIC MARKING MACHINE FOR THE INTRODUCTION OF RING-SHAPED MARKING ELEMENTS INTO RECESSED SUPPORTS

[75] Inventors: Ivana Piana; Silvano Piana, both of Genoa, Italy

[73] Assignee: Grafoplast S.p.A., Italy

[21] Appl. No.: 508,094

[22] Filed: Apr. 10, 1990

[30] Foreign Application Priority Data

May 12, 1989 [IT] Italy .............................. 12494 A/89

[51] Int. Cl.[5] .............................................. B23Q 7/10

[52] U.S. Cl. ...................................... 29/809; 29/281.1; 29/281.5

[58] Field of Search ................. 29/771, 775, 809, 709, 29/718, 714, 787, 788, 789, 790, 795, 796, 797, 281.1, 281.5

[56] References Cited

U.S. PATENT DOCUMENTS

| | | | |
|---|---|---|---|
| 2,840,892 | 7/1958 | Erdmann | 29/809 |
| 3,605,238 | 9/1971 | Eschholz | 29/809 |
| 3,605,239 | 9/1971 | Eschholz | 29/809 |

FOREIGN PATENT DOCUMENTS

| | | |
|---|---|---|
| 139136 | 2/1985 | European Pat. Off. . |
| 2551688 | 3/1985 | France . |
| 2141691 | 1/1985 | United Kingdom . |

*Primary Examiner*—P. W. Echols
*Assistant Examiner*—David P. Bryant
*Attorney, Agent, or Firm*—Rosenman & Colin

[57] ABSTRACT

A marking machine for marking cable markers has a frame bearing a plurality of strips of ring shaped marking elements, a tab mounted on a reciprocating carriage, and devices for positioning a ring-shaped marking element of each strip in the travel path of the tab. The tab automatically seizes the selected element and introduces it in a recess of a cable marrier.

17 Claims, 3 Drawing Sheets

AUTOMATIC MARKING MACHINE FOR THE INTRODUCTION OF RING-SHAPED MARKING ELEMENTS INTO RECESSED SUPPORTS

BACKGROUND OF THE INVENTION

1. Field of the Invention

The invention relates to an automatic marker system for positioning of codes consisting of ring-shaped marking elements inside a recess of a support for such marking elements.

The marking system may be used for any product or product wrap, but is particularly suitable for marking of cables.

2. Description of Related Art

Several marking systems are known for marking cables, both wire and on electrical equipment, among which is a system using a support to be fitted on the cable or on the equipment, provided with a tubular external recess in which ring-shaped alphanumerical marker elements are introduced with the aid of tab shaped devices. These marking elements together form the complete code of the cable or equipment.

Usually, the ring-shaped elements are glued on flat rectangular cardboard or plastic strips, each of which bears several elements all having the same code. Strips with different codes are normally mounted in tray-codes of various type, so that the marking elements can be progressively removed and introduced in the recess of the support to form the required code.

Obviously, this manual composition and installation of the code, though functional, takes much time especially for cable marking in larger electric installations.

SUMMARY OF THE INVENTION

The invention has the object of providing automatic equipment designed for the selection of the various marking elements, and their introduction into the recess of the support. This equipment is called "an automatic marking machine" and essentially consists of a reciprocating cursor or slider provided with a tab, a rack bearing the strips with the ring-shaped marking elements and a support for this rack. Each strip is positioned, by suitable controls, so that the last lower marking element is located on the sliding path of the tab, which will thus seize the selected ring, detach it from the strip and introduce it in the recess on the support.

Marking of the equipment or cable is automatically achieved by repeating this operation as many times as there are marking elements forming the code, ready to be applied on the cable or electrical equipment.

The tab may also remove at the same time several marking elements from different strips to prepare and introduce the final marking code in the recess on the support.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE PREFERRED EMBODIMENTS

Figure 1:
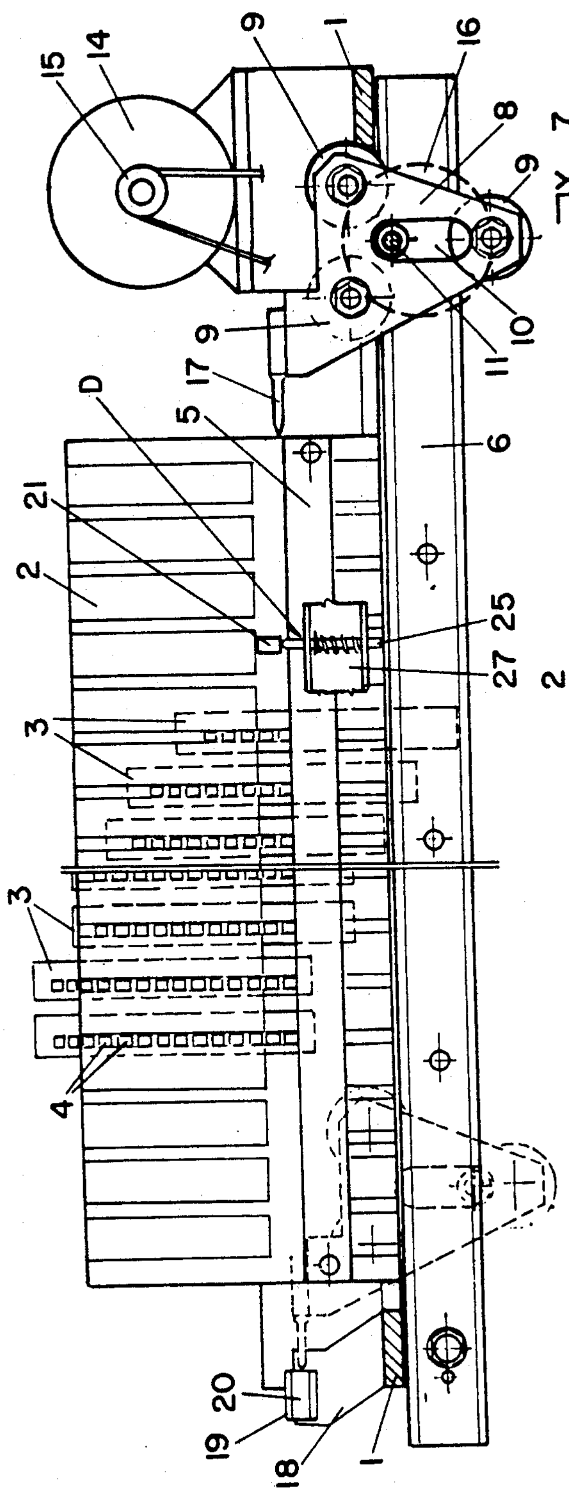
FIG. 1 shows a vertical section of the marking machine according to the invention along line X—X of FIG. 2.
Figure 2:
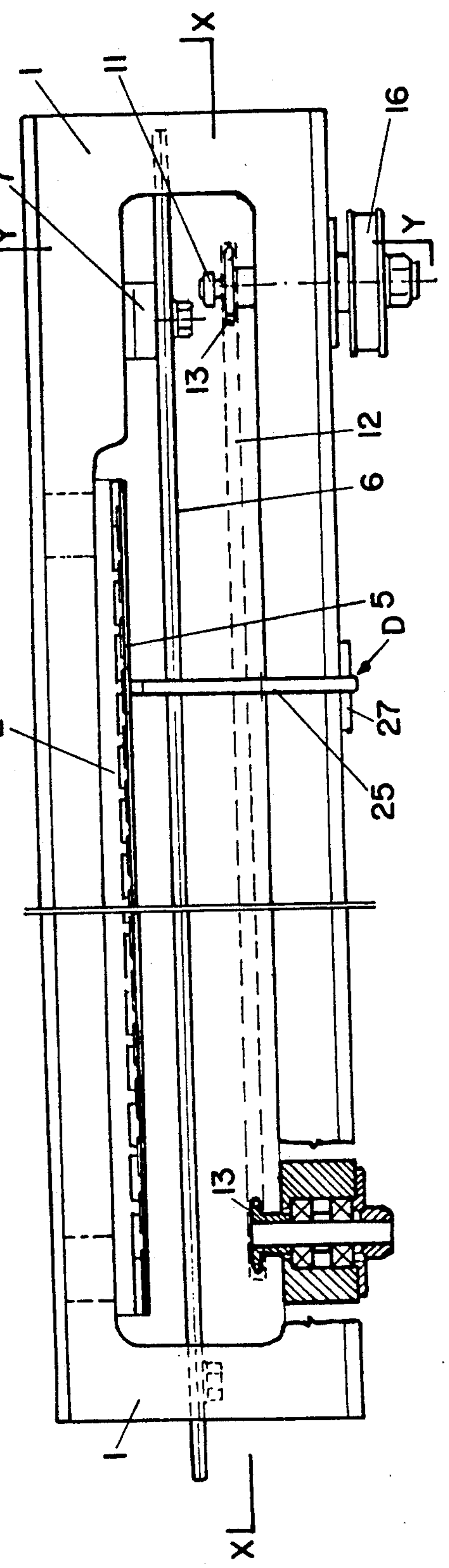
FIG. 2 shows a top view of part of the marking machine.
Figure 3:
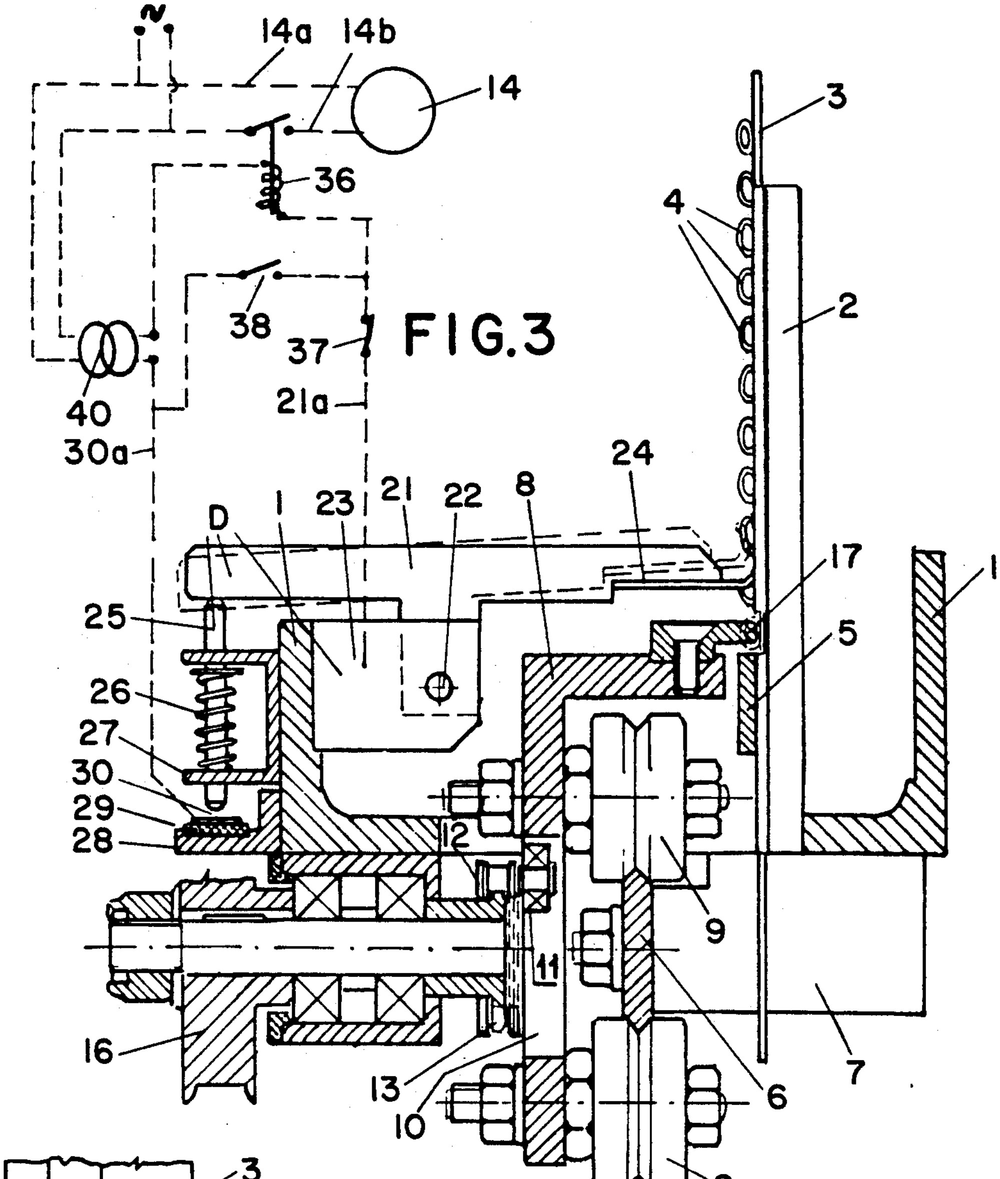
FIG. 3 shows a magnified section of the marking machine along line Y—Y of FIG. 2.

With reference to FIGS. 1, 2, and 3 the marking machine will be seen to have a hollow bearing frame 1 provided with supports or feet (not shown in the drawings).

Figure 4:
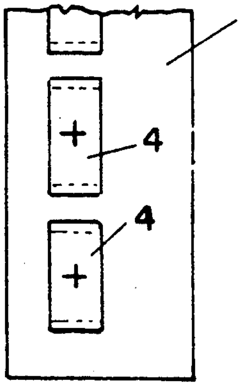
FIG. 4 shows a front view of a partial strip, bearing ring-shaped marking elements.
Figure 5:
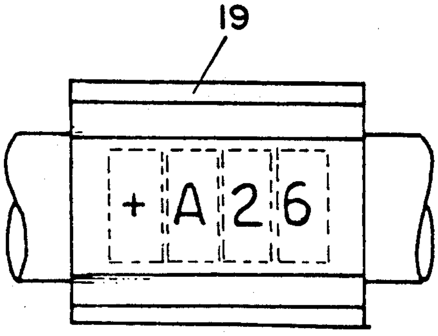
FIGS. 5 and 6 show respectively a top and a lateral view of a marked support, and, FIG. 7 shows a top view of a marking machine with a rotating drum.
Figure 6:
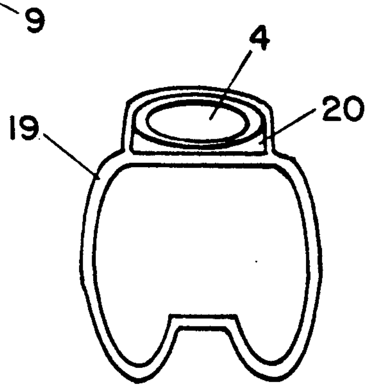

For exemplification purposes, FIG. 4 shows part of the cardboard strip with the symbol "+", while the marker or support is illustrated in FIGS. 5 and 6 with the marking "+A26" consisting of the ring-shaped marking elements.

A vertical longitudinal rack 2, located on one side of the hollow portion of the frame 1, carries numerous vertical strips 3 on which the ring-shaped marking elements 4 are attached. These marking elements face the central hollow portion of the frame 1, and protrude from the rack 2 with their holes located on a lengthwise horizontal axis. A cross member 5 acts as a support for the last lower marking element 4 of each strip 3. When this last lower marking element is removed, the strip moves downward until the next marking element is resting on the above mentioned cross member, provided this downward movement is permitted as will be explained hereinafter.

A horizontal longitudinal bar 6, consisting of a flat bar with upper and lower, preferably V-shaped, edges is located in the central hollow portion of the bearing frame 1. The flat bar is secured by guides 7 onto the frame 1.

An L-shaped carriage 8 supported and guided by idlers 9 is slidable along the longitudinal horizontal bar 6. The central recessing of the idle wheels 9 matches the guide profile of the flat bar 6 forming, for exemplification purposes, a re-entering V-shape.

A bearing or pin tooth 11 is slidable vertically in a slot 10, machined in the vertical side of the L-shaped carriage 8. This pin tooth 11 is driven by a chain 12 running on two gear wheels 13, one of which is a driving gear.

This driving gear 13 is controlled by a motor 14 and pulleys 15, 16 the latter pulley 16 being keyed onto the shaft of the gear wheel 13.

The continuous motion of the chain 12 is thus transformed, by means of the pin tooth 11 and the slot 10, into a horizontal reciprocating movement of the carriage along the bar 6. At the end of each reverse in the direction of the chain 12, the tooth slides in the slot so as to reverse the direction of movement.

The carriage 8 is fitted with a pick-off member or pointed tab 17, its tip pointing to the left in lengthwise direction as shown in the drawings and positioned slightly above the cross member 5, so that the tip of the tab 17 can easily enter the hole of the ring-shaped marking element resting on the cross member 5.

A supporting structure 18, provided with means for holding the marking element support 19, is mounted on one end of the rack 2, i.e. at the left end of the travel path of the tab as shown in FIG. 1 so that the recess 20 in the support 19 coincides with the moving axis of the tab 17.

The tab 17, during its leftward movement (as shown in the drawings), will thus engage a ring-shaped element 4 resting on the cross member 5, removing it from its strip and introducing it in the recess 20 on the support 19 where it remains due to the friction between the ring and the inner recess wall.

Automatic operation of the above described equipment and automatic lowering of the strip with the required marking element so that the last element of this strip element rests on the cross member 5 while the other strips remain raised, are achieved by means of a plurality of control devices D there being one such device D for each strip 3. Only one such control device D is shown in FIG. 1, but it will be understood that there will be a separate control device D for each strip 3.

Each control device D consists of a lever 21 (FIG. 3) with a lengthwise horizontal hinge pin 22 secured in a plate 23 fastened onto the frame 1. At its end pointing in the direction of the strip 3, lever 21 has a lamination 24 with a curved tip whereas the other end of the lever 21 is pushed upwards by a spring loaded device, consisting of a vertical stem 25 and a spring 26 supported by a longitudinal channel section 27 which is shared by all strips 3.

A longitudinal section 28 bearing on its upper surface a first insulating strip 29 on which a second conductive strip 30 is applied, is located below the stem 25.

Levers 21, stems 25, and the conductive strip 30 are connected in a manner known per se, in a low voltage control circuit comprising wires 21*a* and 30*a*, and relay switch 36 and on/off selector switch 37 (FIG. 3). Power is supplied to motor 14 by wires 14*a* and 14*b*, and relay switch 36 makes and breaks this circuit to control the motor. A start switch 38 is provided for reasons to be described below. A transformer 40 supplies low voltage power to wires 30*a*–21*a*.

The control device operates as follows: In its rest position, the lever 21 is raised by the spring 26 so that the curved tip of the lamination 24 presses against the strip 3 thus preventing its lowering to hold the lower ring-shaped marking element 4 above the cross member 5.

In these conditions, the tab 17 which moves in front of the strips 3, will find no ring-shaped elements in its path. However, when the outer end of the lever 21 is pressed down, counteracting the spring 26, the curved tip of the lamination 24 will release the strip 3 which is thus lowered so that the lower ring 4 will rest on the cross beam 5. In these conditions, the tab 17 while moving in front of the strip, will engage the ring shaped element 4, remove it from its strip and introduce it in the recess of the support 19.

Pressing down the outer end of the lever 21, resulting in lowering the stem 25, will bring the stem 25 in contact with the conductive strip 30. Therefore, when energizing the control circuit of the driving motor 14 by means of the lever 21 and the conductive strip 30, each time the outer end of the lever is pressed down to release the related strip, the motor is actuated and the tab removes the ring shaped element from the strip which has been lowered by the lever and introduces it in the recess 20 in support 19.

The marking codes are thus automatically obtained by pressing the levers 21, which is like pressing the keys of a typewriter, causing the marking rings progressively to be removed from their strips and introduced in the recess on the support. Marking jobs on cables and electrical equipment can thus be performed very fast and with great precision, according to the aim of this invention. The above description is not only valid to remove the ring-shaped marking elements progressively but can also be used to form a complete code by removing all marking elements at the same time. This is achieved by lowering at the same time all levers involved in the marking code so that the corresponding strips are lowered and the related rings all rest on the cross member 5.

The tab then removes the marking elements in one single pass and introduces them in the recess 20 on the support 19. Care must only be taken to ensure that the strips of the marking elements forming the code be positioned on the rack in the proper order in which they appear in the code.

For this purpose, the on/off selector switch 37 is provided in a suitable position, to cut out part of the electric circuit regarding the strip 30 (thus limiting the function of the levers 21 to the mechanical release of the preselected strips 3), then to change over to another electric circuit energized by a "start" pushbutton 38. The latter, when pressed, will energize the motor circuit, thus starting the tab which, in one single movement, removes the entire marking code and introduces it in the recess 20. Cutting-out the strip 30 also permits the removal of single marking elements in a non-automatic mode.

Usually, marking codes are repetitive, i.e., two or more supports are marked with the same code (for instance at both ends of a cable), so that the supporting structure 18 may be modified with an articulated joint or slider, carrying two or more supports 19 progressively with their recesses aligned with the tab 17. It is also possible to devise a support 19 which is a continuous support obtained by extrusion. This continuous support, after having received the marking codes will automatically cut to length.

The automatic marking machine which is the subject of the invention may have multiple components, i.e. it may be provided with more than one rack placed transversly on end and with more than one tab, all tabs being located on the same base so that it will be possible to form a multiple number of coded supports at the same time.

It is clear that some parts in this exemplified configuration proposed herein may be replaced by others that are similar and have the same aim. In particular, the alternative control mechanisms of the tab may be replaced by other mechanisms, e.g. a dynamic flow mechanism, or an electric piston, a connecting rod and crankshaft mechanism, etc. The marking machine may also be operated manually.

Figure 7:
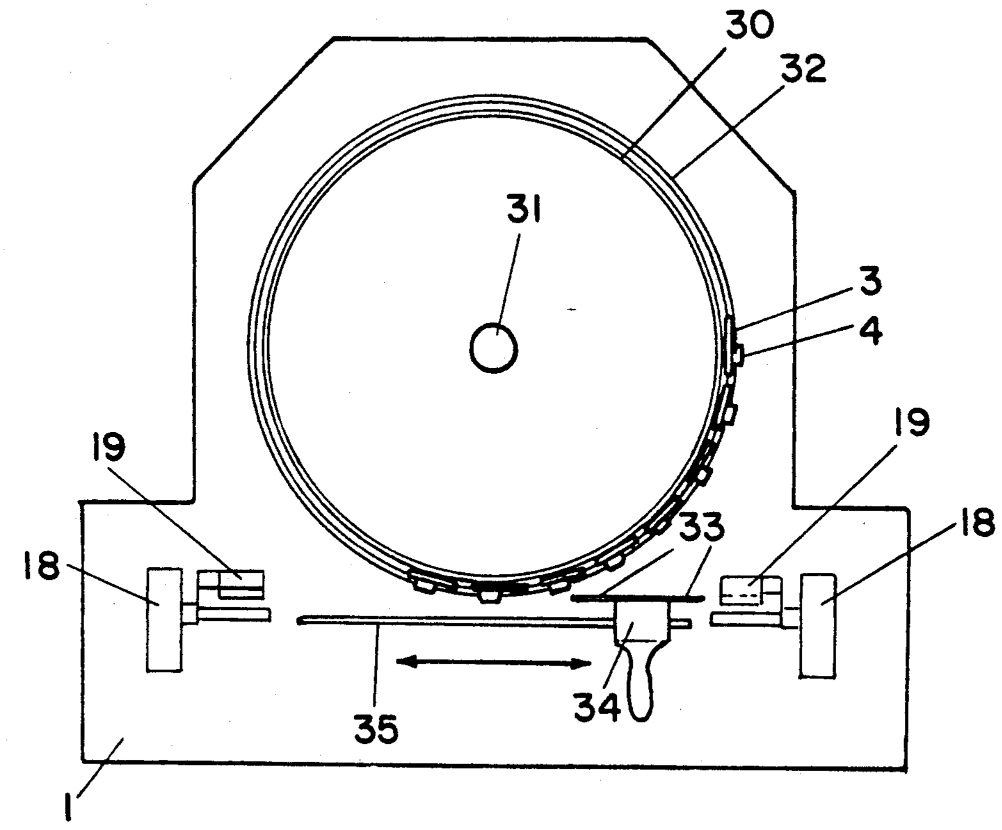

FIG. 7 shows an embodiment of a marking machine with a drum-shaped rack 30, rotating on a vertical axis 31, peripherally bearing strips 3 with ring shaped, radially outwardly facing marking elements 4. The cross member 32 on which the lower ring of each strip is resting, is annular along the trajectory of the tabs 33. This approach, here illustrated as an example for manual operation, may also be motor driven. The cursor or carriage 34 moved by a handle grip, is slidable along the guide 35 and features two opposed tabs 33 which make it possible to provide, at each to-and-fro movement, for marking of two supports 19 with their recesses 20 mounted on opposed lateral supporting structures 18.

Since only one of the ring-shaped marking elements 4 of the various strips is located in the path of the tabs, no device is needed to keep the strips lifted. Drum rotation for positioning of the ring-shaped element to be removed may either be manual or motor-driven by keyboard controlled positioning of the drum. An electronic memory may automatically adjust the sequence of the marking elements according to the established code.

The marking machine described with reference to the supports for cables, wires and electrical equipment may be easily adjusted for marking of any other product or product package provided with a recess in which to introduce the ring shaped marking elements.

The foregoing is a description of a preferred embodiment of the invention which is given here by way of example only. The invention is not to be taken as limited to any of the specific features as described, but comprehends all such variations thereof as come within the scope of the appended claims.

The embodiments of the invention in which an exclusive property or privilege is claimed are defined as follows:

1. A marking apparatus for inserting marking elements into cable markers, each of said markers having a recess extending therethrough, said apparatus comprising:

(a) a frame;

(b) a carriage mounted on the frame for reciprocating movement, and having an elongated pick-off member jointly movable with the carriage between end positions along a travel path that extends along a longitudinal direction;

(c) a rack mounted on the frame;

(d) a plurality of elongated carrier strips, each mounted on the rack for displacement along a transverse direction normal to the travel path, each carrier strip detachably holding a plurality of marking elements arranged in a row along the transverse direction, each marking element bearing a mark and bounding a passage that extends along the longitudinal direction through a respective marking element;

(e) positioning means for selectively positioning a passage of at least one marking element of at least one of the carrier strips in the travel path of the pick-off member;

(f) a holder for holding the marker, and for positioning the recess in, and along, the travel path of the pick-off member, at one of the end positions; and (g) drive means for moving the carriage, and for moving the pick-off member from the other of the end positions along the travel path to said one end position, said pick-off member extending through the passage of said at least one marking element and detaching said at least one marking element from said at least one carrier strip during movement along the travel path, said pick-off member carrying and inserting said at least one detached marking element into the recess of the marker held in the holder prior to returning to said other end position.

2. The apparatus as claimed in claim 1, wherein the frame includes a stationary guide bar extending along the longitudinal direction, and wherein the carriage includes guide rollers mounted on the guide bar for rolling movement along the guide bar.

3. The apparatus as claimed in claim 2, wherein the drive means includes an electric motor and a transmission between the motor and the carriage for moving the carriage.

4. The apparatus as claimed in claim 3, wherein the transmission includes a pair of rotary pulleys spaced apart along the longitudinal direction, and a drive chain entrained about the pulleys, one of the pulleys being operatively connected to and rotated by the motor.

5. The apparatus as claimed in claim 3, wherein the carriage includes a slot extending along the transverse direction, and wherein the transmission includes a bearing received in, and slidable along, the slot.

6. The apparatus as claimed in claim 1, wherein the pick-off member includes a spear-like shaft having a pointed tip.

7. The apparatus as claimed in claim 1, wherein each strip is constituted of a sheet material, and wherein each marking element has an annular, ring-like configuration.

8. The apparatus as claimed in claim 1, wherein the rack is a generally planar vertical plate that is stationarily mounted on the frame, and wherein the plurality of strips are mounted in a common vertical plane on the plate.

9. The apparatus as claimed in claim 8, wherein the positioning means includes a positioning bar extending linearly along the longitudinal direction below the strips, said at least one marking element resting on the positioning bar.

10. The apparatus as claimed in claim 9, wherein the positioning means further includes a plurality of elongated levers, one for each strip, each lever being mounted on the frame for pivoting movement between a gripping position and a release position; a gripping member mounted at one of the ends of each lever for gripping the respective strip in the gripping position to resist displacement along the transverse direction toward the positioning bar; biasing means at the other of the ends of each lever for constantly urging a respective gripping member into gripping engagement with the respective strip in the gripping position, each said other end of each lever being movable against the urging of the biasing means to the release position in which the respective strip is free to be displaced along the transverse direction to the positioning bar.

11. The apparatus as claimed in claim 10, wherein the positioning means generates a control signal when at least one lever is pivoted to the release position, and wherein the drive means is operative to move the carriage upon receipt of the control signal.

12. The apparatus as claimed in claim 1, wherein the rack is a cylindrical drum mounted for rotation about a vertical axis on the frame, and wherein the plurality of strips are mounted in an annulus about the drum.

13. The apparatus as claimed in claim 12, wherein the positioning means includes an annular positioning bar extending circumferentially about the drum below the strips, said at least one marking element resting on the positioning bar.

14. The apparatus as claimed in claim 13, wherein the travel path of the pick-off member extends tangentially of the drum.

15. The apparatus as claimed in claim 14, wherein the carriage has a pair of said pick-off members, each extending in opposite directions along the travel path.

16. The apparatus as claimed in claim 15, wherein a pair of said holders are mounted on the frame, each holder being mounted at a respective end position of the travel path.

17. The apparatus as claimed in claim 1, wherein the marker is mounted on an electrical cable for identifying the cable.

* * * * *